United States Patent
Schumacher

(10) Patent No.: US 8,029,756 B1
(45) Date of Patent: Oct. 4, 2011

(54) CLOSED-LOOP SILICON PRODUCTION

(75) Inventor: John C. Schumacher, Albany, OR (US)

(73) Assignee: Peak Sun Sillcon Corporation, Albany, OR (US)

( * ) Notice: Subject to any disclaimer, the term of this patent is extended or adjusted under 35 U.S.C. 154(b) by 0 days.

(21) Appl. No.: 12/750,566

(22) Filed: Mar. 30, 2010

(51) Int. Cl.
*C01B 33/02* (2006.01)
*C01B 33/08* (2006.01)

(52) U.S. Cl. ......... 423/349; 423/348; 423/341; 423/342

(58) Field of Classification Search .......... 423/341–343, 423/348–350
See application file for complete search history.

(56) References Cited

U.S. PATENT DOCUMENTS

| | | | |
|---|---|---|---|
| 2,943,918 A | 7/1960 | Paiils | |
| 3,012,861 A | 12/1961 | Ling | |
| 3,012,862 A | 12/1961 | Bertrand et al. | |
| 3,020,129 A | 2/1962 | Herrick | |
| 4,084,024 A | 4/1978 | Schumacher | |
| 4,309,259 A | 1/1982 | Sarma et al. | |
| 4,318,942 A * | 3/1982 | Woerner et al. | 427/213 |
| 4,956,326 A * | 9/1990 | Yoneda et al. | 502/178 |
| 5,910,295 A | 6/1999 | DeLuca | |
| 6,368,568 B1 * | 4/2002 | Lord | 423/350 |
| 7,754,175 B2 * | 7/2010 | Bill et al. | 423/349 |
| 2002/0044904 A1 * | 4/2002 | Bulan et al. | 423/342 |
| 2004/0062702 A1 * | 4/2004 | Block et al. | 423/347 |
| 2007/0098612 A1 | 5/2007 | Lord | |
| 2007/0173671 A1 * | 7/2007 | Bohmhammel et al. | 570/258 |
| 2008/0056979 A1 * | 3/2008 | Arvidson et al. | 423/350 |
| 2009/0060818 A1 * | 3/2009 | Bill et al. | 423/342 |
| 2010/0032630 A1 * | 2/2010 | Hariharan et al. | 252/516 |
| 2010/0061913 A1 * | 3/2010 | Hariharan et al. | 423/342 |

OTHER PUBLICATIONS

Luque et al. "Handbook of Photovoltaic Science and Engineering", John Wiley and Sons, England, 2003, 167-177.*

* cited by examiner

*Primary Examiner* — Stanley Silverman
*Assistant Examiner* — Anthony J Zimmer
(74) *Attorney, Agent, or Firm* — Haynes and Boone, LLP

(57) ABSTRACT

A closed loop bromosilane process is provided to provide semiconductor grade silicon through the thermal decomposition of tribromosilane. The resulting silicon tetrabromide byproduct from this thermal decomposition is recycled in a silicon tetrabromide converter to produce converted tribromosilane.

5 Claims, 2 Drawing Sheets

CLOSED-LOOP SILICON PRODUCTION

TECHNICAL FIELD

The present invention relates generally to silicon production, and more particularly to a closed-loop silicon production system and method.

BACKGROUND

Electrical energy production through solar conversion is of ever greater need in light of global warming resulting from the use of fossil fuel. However, energy production from solar conversion is often more expensive than a comparable production from fossil fuels. One major factor in the balance between fossil fuel use and the cleaner and more environmentally friendly solar conversion is the cost of the necessary solar conversion modules and their efficiency. The highest efficiency solar modules use a silicon wafer substrate derived from semiconductor grade silicon. Given the need to reduce global warming and the resulting demand for solar modules, semiconductor grade silicon prices have increased markedly. Lower cost solar modules can be produced using thin-film techniques but so far such modules are neither as efficient nor as long-lived as traditional silicon-wafer-based solar modules. The lack of efficiency for thin-film solar modules is problematic during winter and cloudy conditions. Accordingly, there is a pressing need for more efficient and cost-effective semiconductor grade silicon production techniques. In this fashion, environmentally friendly solar conversion can compete with superficially less expensive fossil fuel uses.

Conventional semiconductor grade silicon production techniques are not only costly but often create environmental problems resulting from toxic waste byproducts. Production of ultrapure polysilicon commonly begins with a trihalosilane feedstock that is thermally decomposed into silicon and a tetrahalosilane byproduct. For example, in the Siemens process, trichlorosilane is reduced to produce silicon with tetrachlorosilane as the byproduct. This process was traditionally open loop and thus resulted in significant hazardous waste production. The production of polysilicon through the Siemens process in less-developed countries has lead to alarming environmental degradation with open and notorious dumping of the toxic byproducts. In addition to its polluting nature, the Siemens process also demands considerable use of energy because it is a relatively-high temperature process.

In contrast to the open-loop Siemens process, the tetrahalosilane byproducts are reused in a closed-loop process. A closed-loop process is thus inherently less polluting and uses less energy. For example, U.S. Pat. No. 4,318,942 (the '942 patent) discloses a closed-loop polysilicon production process in which tribromosilane (TBS) is thermally decomposed into silicon, silicon tetrabromide (STB) and hydrogen gas ($H_2$). It may be observed that STB may also be denoted as tetrabromosilane but such a designation will have the same acronym (TBS) as tribromosilane and is thus avoided herein. As disclosed in the '942 patent, the tetra-halogenated byproduct STB along with the hydrogen gas byproduct are recycled in a converter using metallurgical grade silicon (MGSi, 95% pure) according to the reaction of:

$$MGSi + 3SiBr_4 + 2H_2 \rightarrow 4SiBr_3H \qquad (1)$$

to produce TBS, which may then be thermally decomposed as just described. In this fashion, the impure silicon in the converter transforms into ultra-pure polysilicon with no halogenated silane byproducts—these byproducts are entirely recycled such that STB becomes TBS, which is then produces STB as a byproduct during thermal decomposition, and so on. The resulting closed-loop reuse of the silicon tetrabromide byproduct is not only environmentally friendly, it is energy efficient as well in that TBS thermally degrades at lower temperatures as compared to those required for trichlorosilane techniques. In addition, TBS production of silicon advantageously produces a preferable granular form factor for the resulting silicon as compared to traditional chlorosilane approaches.

Although the closed loop process disclosed in the '942 patent is thus advantageous, some inefficiency results from the recycling of the STB and hydrogen byproducts in that these byproducts are in ultra-pure form yet they are reacted with relatively impure silicon to produce TBS. The resulting TBS must then be purified such as through distillation before it can be thermally decomposed into silicon. This purification requires a substantial amount of energy.

Accordingly, there is a need in the art for improved closed-loop polysilicon production techniques.

SUMMARY

In accordance with one embodiment of the disclosure, a method of closed loop silicon production is provided that includes: synthesizing tribromosilane (TBS) to produce synthesized TBS; thermally decomposing a feedstock tribromosilane (TBS) to produce silicon and a byproduct silicon tetrabromide (STB); and converting the byproduct STB into converted TBS, wherein the feedstock TBS comprises the synthesized TBS and the converted TBS.

In accordance with another embodiment of the disclosure, a system for the production of silicon is provided that includes: a synthesis reactor for synthesizing tribromosilane (TBS) to produce synthesized TBS; a purification distillation tower for purifying the synthesized TBS from the synthesis reactor to provide purified TBS, the purification distillation tower also separating out resulting impurities from the TBS from the synthesis reactor; a deposition reactor for thermally decomposing a feedstock TBS into silicon and a byproduct silicon tetrabromide (STB), and a converter for converting the byproduct STB into converted TBS such that the feedstock TBS comprises the converted TBS and the purified TBS, whereby the byproduct STB is recycled without exposing it to the resulting impurities.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

A closed-loop production process is disclosed in which tribromosilane (TBS) is thermally decomposed into ultra-pure silicon according to the reaction of:

$$4SiHBr_3 \rightarrow Si + 3SiBr_4 + 2H_2 \quad (2)$$

It can be seen from reaction (2) that the decomposition of four moles of TBS produces one mole of silicon (25% maximum yield) along with three moles of purified STB and two moles of hydrogen. Rather than react this ultrapure STB and hydrogen with relatively-impure metallurgical grade silicon as disclosed in the '942 patent to synthesize TBS, these purified byproducts are converted such as by the reaction of:

$$SiBr_4 + H_2 \rightarrow SiHBr_3 + HBr \quad (3)$$

so that no impurity exposure occurs to the fed back byproducts. Comparing equations (2) and (3) shows that silicon must be replaced as one unit of it will be consumed (assuming 100% efficiency) for every unit production of silicon. Thus, the hydrogen bromide produced by the conversion of STB to TBS is used to halogenate metallurgical grade silicon (MGSi) into a TBS/STB feedstock for the process.

Figure 1:
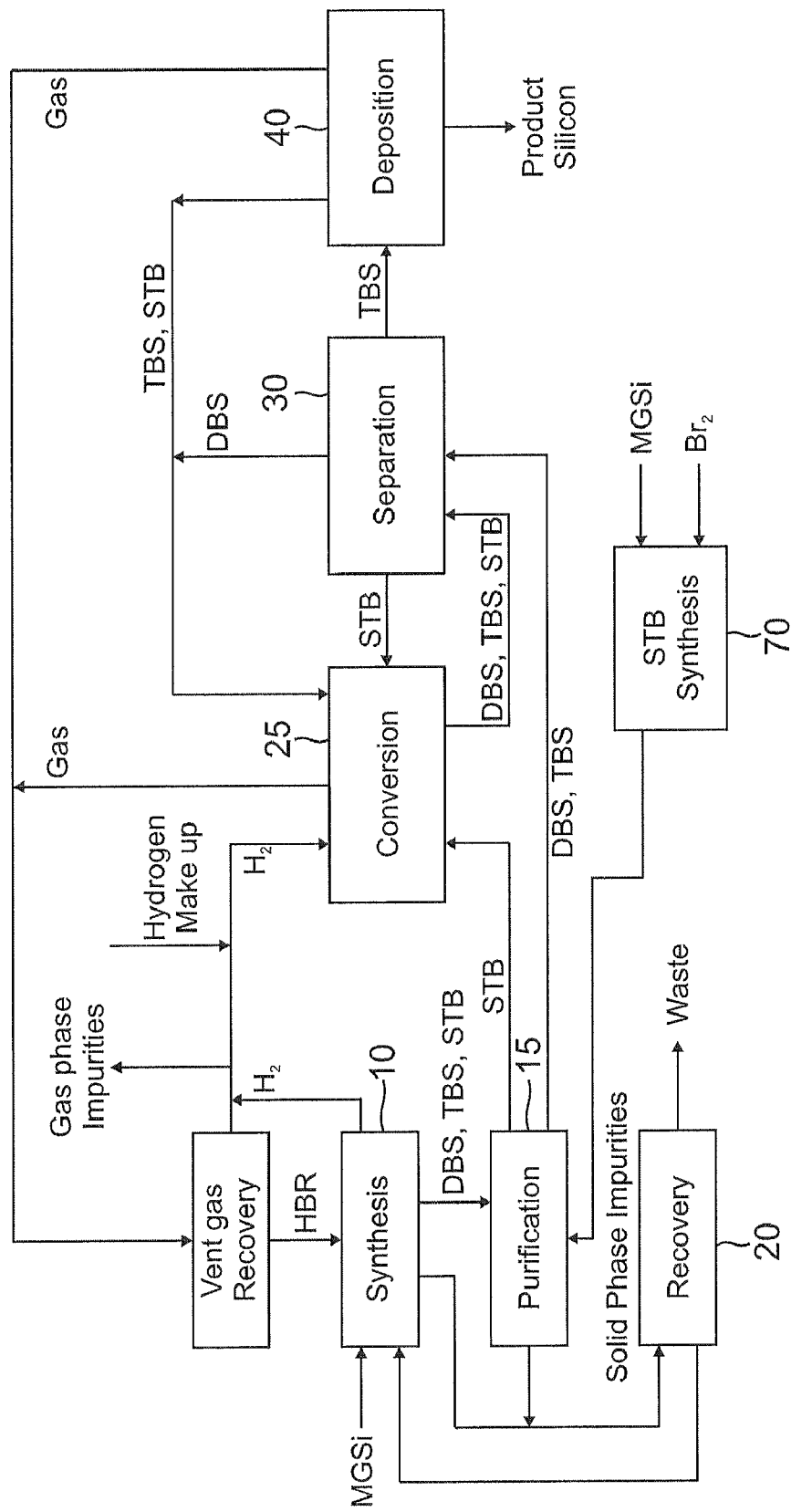
FIG. 1 is a schematic diagram of the silicon production process according to an embodiment of the invention.

The resulting closed-loop production of silicon involving the conversion of STB into TBS may be better understood with reference to the process schematic of FIG. 1. To begin the process, metallurgical grade silicon having a purity of, for example, 98% is reacted with hydrogen bromide (HBr) in an TBS synthesis reactor 10 such as a fluidized bed reactor heated to approximately 400° C. according to the reaction of:

$$MGSi + 3HBr \rightarrow SiHBr_3 + H_2 \quad (4)$$

The metallurgical grade silicon is thus reduced to the appropriate particle size and loaded into reactor 10 prior to the TBS synthesis. Although TBS is thus preferentially formed in reactor 10, some STB and dibromosilane (DBS) will also be formed according to the reactions of $$Si + 4HBr \rightarrow SiHBr_4 + SiBr_4 + 2H_2 \quad (5)$$

$$Si + 2HBr \rightarrow SiH_2Br_2 \quad (6)$$

The STB and DBS byproducts may be readily separated from the STB in a purification/separation unit 15 such as a multi-plate distillation tower 15. But tower 15 must do more than just separate STB from the TBS and DBS byproducts in that the impurities introduced with the metallurgical grade silicon must also be prevented from contaminating downstream components. These impurities increase the number of plates and/or the reflux ratio for the resulting distillation tower. For example, the impurity dimethyl dibromosilane has a boiling point very close to that of TBS. Although the removal of these impurities increase the tower cost and associated energy use as compared to a distillation that merely separates TBS, DBS, and STB, note that no feedback products are returned to distillation tower 15. As will be explained further herein, such a feature represents a significant advantage over prior art closed loop bromosilane silicon production processes. Solid phase metal bromide impurities from tower 15 and synthesis reactor 10 are delivered to a recovery unit 20 and any recovered bromine returned to reactor 10. Recovery unit 20 may, for example, react oxygen with the metal bromides to produce metal oxides and free bromine according to $MBr_2 + \frac{1}{2}O_2 \rightarrow MO + Br_2$, where M represents a metal.

The waste by-products from recovery unit 20 are thus removed mostly as metal oxides. Although such a removal advantageously removes the undesirable metal impurities introduced by the metallurgical grade silicon feedstock, it will eventually require the replacement of bromine into the system in that un-reacted metal bromides are also removed. To provide this necessary bromine, an STB synthesizer 70 is provided to react metallurgical grade silicon with bromine ($Br_2$) to produce STB. This strongly exothermic reaction takes place at approximately 700° C. and as a result requires construction from super alloys such as Haynes 230. This process will be operated approximately 5% of the time. In other words, synthesis of STB occurs in a batch fashion in synthesizer 70 as compared to the continuous deposition of silicon performed by the system of FIG. 1.

TBS synthesis reactor 10 and distillation tower 15 thus operate to first produce ultra-pure (impurities being in the parts per billion range or less) TBS using just recycled HBr and MG-Si whereas prior art processes such as that disclosed in U.S. Pat. No. 4,318,942 introduce recycled STB in this synthesis process as well. Accordingly, an STB converter 25 is provided to convert the ultra-pure STB from the thermal decomposition of TBS. For example, converter 25 may comprise a packed bed reactor containing an oxide catalyst such as silicon oxide. Recovered hydrogen from STB synthesis reactor 10 and STB from tower 15 reacts within STB converter 25 according to the reaction of:

$$SiBr_4 + H_2 \rightarrow SiHBr_3 + HBr \quad (7)$$

The conversion fraction of STB into TBS increases with temperature at a range of 600° C. to 800° C. This conversion fraction also increases as the hydrogen/STB feed ratio is increased. But note that this production of TBS will be opposed by the thermal decomposition of TBS back into silicon, STB, and hydrogen as discussed with regard to reaction (2) above. This thermal decomposition is accelerated if the converter temperature is increased above 800° C. or if the residence time at the converter operating temperature is increased more than a total of 3 or 4 seconds. The thermal decomposition is reversible in that the opposite reaction (5) will also act to convert STB into TBS within STB converter 25. It will be appreciated, however, that an important factor within an industrial process is not the conversion ratio per se but instead the mass production per unit of reactor volume and per unit of time (e.g., pounds/hour/foot³). Thus, a balance should be achieved for converter 25 to produce the maximum TBS generation rate in these terms. It has been observed that such a balance may be achieved at hydrogen/STB ratios below twelve, temperatures between 600° C. to 800° C., and residence times between one and six seconds. The STB converter will be discussed further below but attention will now be directed to the purification of the resulting TBS from the STB converter.

STB converter 25 provides TBS as well as some DBS and un-reacted STB. These products from STB converter 25 are rapidly quenched into liquids and delivered to a separation distillation tower 30. As compared to tower 15 that performs both purification and separation, separation tower 30 may use a reduced number of plates since the boiling points of DBS, TBS, and STB are such that they are readily separated from one another. In addition, a reduced amount of reflux will be required for tower 30 to separate TBS from the STB and DBS. Thus, distillation tower 30 is not only less expensive to build as compared to distillation tower 15 but will have lower operating costs (energy consumption) as well. The resulting TBS from converter 25 is delivered to a deposition reactor 40 so that the TBS may be thermally decomposed into product silicon as discussed with regard to reaction (1) above. Hydrogen and any HBr from deposition reactor 40 and STB converter 25 are recycled and separated at a vent gas recovery unit 50 so that the resulting HBr may feed TBS synthesis reactor 10 and the recycled hydrogen may be provided to STB converter 25.

Deposition reactor 40 may be a moving bed reactor or a fluidized bed reactor such as discussed in the U.S. Pat. No. 4,318,942, the contents of which are incorporated by reference herein. The bed in deposition reactor 40 comprises high-purity silicon particles. As compared to a chlorosilane Siemens process, ultra-pure silicon is produced by such a deposition reactor without the need for energy-expensive high temperatures in that deposition reactor 40 operates at atmospheric pressure in the relatively low temperature range of 600° to 800° C. In contrast, a Siemens process reactor will require temperatures in the 1200° C. range and operates in batch mode as compared to the continuous process for deposition reactor 40. A particular advantage is obtained if the walls for reactor 40 are kept at greater than 900° C. while the bed temperature is maintained below 800° C. in that reactor wall scale is eliminated or greatly reduced. Moreover, the resulting silicon is produced in uniformly sized beads that are readily converted into a mono-crystalline ingot as compared to the coated reactor rods for the Siemens process. In addition, the Siemens process produces toxic silicon tetrachloride that is often just dumped by unscrupulous producers in less-developed countries, at great cost to the environment. In contrast, the STB byproduct from reactor 40 is conveniently recycled in STB converter 25 to help produce the desired TBS feed for deposition reactor 40.

Figure 2:
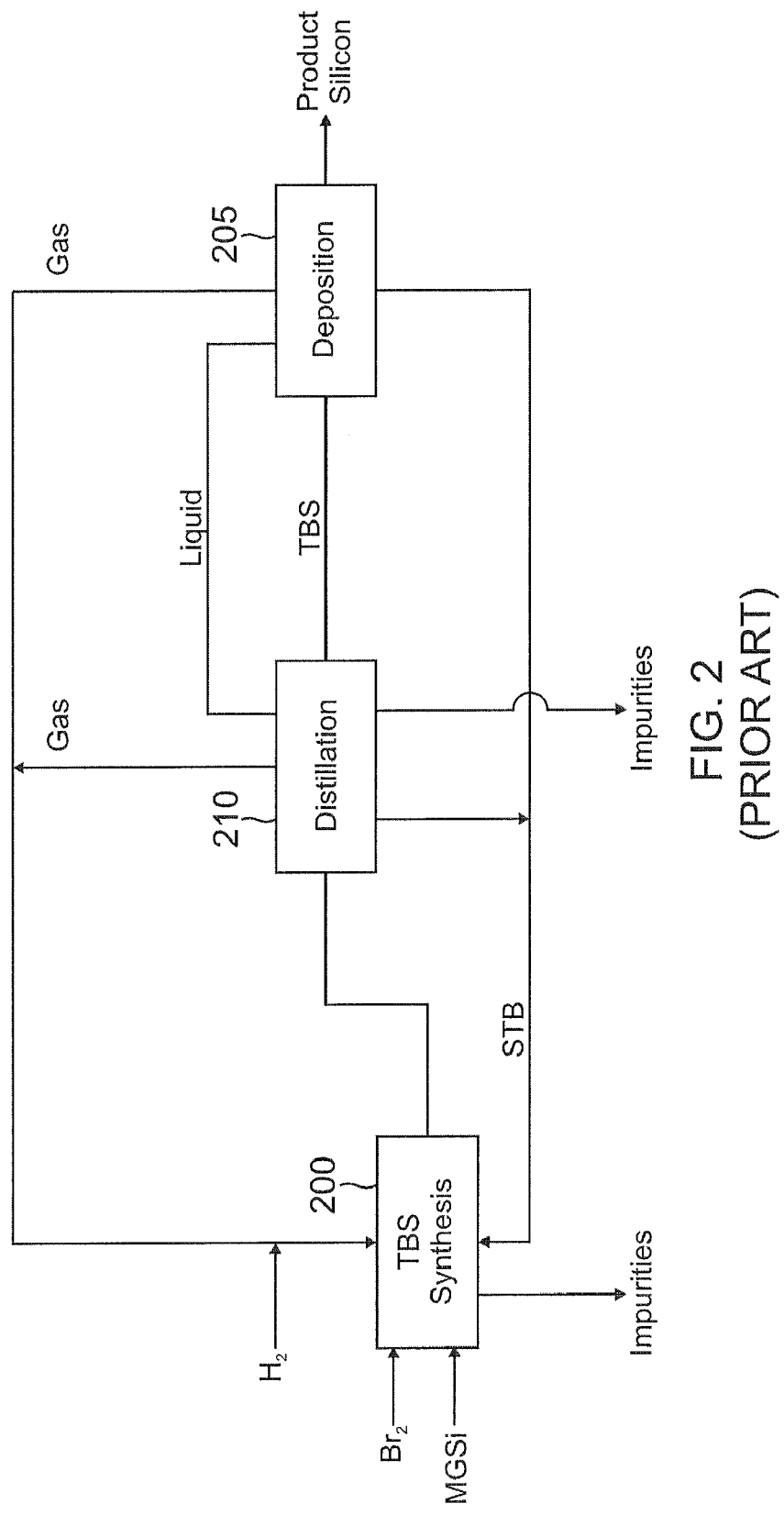
FIG. 2 is a high level diagram for a conventional closed loop silicon production process.

Although prior art closed-loop bromosilane processes such as disclosed in the U.S. Pat. No. 4,318,942 also recycle STB from the deposition reactor, the process illustrated in FIG. 1 has a significant advantage in that the STB from deposition reactor 40 is in an ultra-pure state and is not then exposed to any impurities. In contrast, FIG. 2 summarizes the process disclosed in U.S. Pat. No. 4,318,942 that exposes the recycled STB to impurities. Mg—Si and hydrogen are reacted in TBS synthesis reactor 200 with STB recycled from a deposition reactor 205 in which TBS is thermally decomposed according to reaction (2) as discussed above. Reactor 205 will have at best a 25% conversion efficiency of TBS into product silicon as discussed with regard to reaction (2). Suppose that for either process, 4 moles of TBS are provided to the respective deposition reactors. If the reactors are running at their theoretical optimum, both processes will produce 3 moles of STB byproduct that will then be recycled. In the conventional process of FIG. 2, those 3 moles of STB will be reacted with one mole of silicon (ignoring the impurities in Mg—Si) and two moles of hydrogen gas according to reaction (1) in TBS synthesis reactor 200 to produce the desired four moles of TBS. These four moles of TBS must then be purified in distillation tower 210. But as discussed above, the undesired impurities may have boiling points very close to that for TBS such that the number of plates in tower 210 and/or the reflux ratio is substantial. This is also the case for distillation tower 15 in FIG. 1 but notice that the three moles of STB recycled from reactor 40 do not need to be purified. Instead, distillation tower 15 need only purify one mole of TBS as compared to the four moles of TBS being purified in tower 210. Thus, the energy and capital costs necessary to drive three additional moles of a bromosilane through a purification distillation process are avoided for the process of FIG. 1, which represents a significant cost savings.

Scaling up this 4 mole example into an industrial scale 50 metric ton per year plant would require a 1219 lbs per hour input into TBS synthesis reactor 200 whereas the comparable input to TES synthesis reactor 10 in FIG. 1 would be 205 lbs per hour. This throughput reduction carries through to the purification process in that tower 210 of FIG. 2 must process 1261 lbs per hour at such an industrial scale whereas tower 15 of FIG. 1 need only process 167 lbs per hour. Moreover, the TBS synthesis in synthesis reactor 10 occurs at atmospheric pressure and the relatively low temperature of 360° C. whereas the prior art TBS synthesis requires the relatively high pressure of 500 psi and the relatively higher temperature of 500° C., which again significantly reduces energy consumption costs.

Referring again to STB converter 25, it may be observed that such a converter may be used more generally to convert a silicon tetrahalide (represented as $SiX_4$) into the corresponding trihalosaline (represented as $SiHX_3$). In that regard, it is known to use a metallic catalyst to convert, e.g., silicon tetrachloride into trichlorosilane. The metallic catalyst brings the silicon tetrachloride and trichlorosilane into equilibrium, which results in an equilibrium concentration for trichlorosilane of approximately 20%. The equilibrium concentration for TBS is comparable. However, as the following examples will show, the TBS concentration achieved by converter 25 is approximately twice this equilibrium concentration. This increase follows from the law of mass action in that the reaction gases are rapidly removed from the reactor and quenched into liquids as will be explained further herein.

STB Converter Example

A quartz tube 3 cm in diameter and 30 cm in length was packed with ⅛" diameter spherical granules of silicon oxide to create a packed bed reactor. The resulting reactor received a volumetric flow rate of approximately 70 liters per hour of a gaseous $H_2$/STB mixture. It can be immediately be observed that such a reactor dispenses with the complications caused by finely-divided or powdered catalyst. In addition, the granules of catalyst provide an excellent mechanism for transferring heat to the reactant gas mixture of $H_2$/STB. The large amount of catalyst surface area for the reactor permits a relatively large volumetric flow rate as compared to prior art metallic catalyst approaches. Four different flow rates and H2/STB input ratios at a reactor temperature of approximately 750° C. were used to provide the following results as summarized below:

TABLE 1

| | | | | |
|---|---|---|---|---|
| Space Velocity (cc input gas flow/cc reactor volume) | 330/hr | 381/hr | 339/hr | 381/hr |
| Area flow velocity (cc Flow/cm² of catalyst | 7.708 E-05 M/s | 8.894 E-05 M/s | 7.919 E-05 M/s | 8.885 E-05 M/s |
| Linear Velocity | 0.064 M/s | 0.064 M/s | 0.064 M/s | 0.064 M/s |
| $H_2$/STB molar input ratio | 6 | 5 | 12 | 5 |
| Reactor residence time | 2.4 s | 3.5 s | 3.5 s | 3.5 s |
| Conversion fraction of STB | 20% | 24% | 39% | 45% |

The results achieved in Table 1 above may be compared to prior art silicon tetrahalide conversion processes as disclosed in U.S. Pat. Application No. 2007/0173671. Such a comparison shows that the linear velocity and reactor size were roughly the same as disclosed in U.S. Pat. Application No. 2007/0173671 yet the area flow velocity is 5 orders of magnitude higher, which indicates 100,000 times greater catalytic surface area per reactor volume for the present reactor so as to produce a ten fold increase in production rate. But Table 1 also shows that as the $H_2$/STB vapor enters the reactor, reaction (3) proceeds quickly due to the enhanced catalyst exposure. Since the residence time in the reactor is relatively short followed by a quenching of the reaction product TBS as well as the unreacted STB into liquids as well as a venting of the resulting HBr, the reverse reaction (2) is inhibited to effectively double the equilibrium concentration of TBS according to the law of mass action. To provide the rapid quenching of TBS produced by the STB converter, a cooling jacket may surround the exit of the converter to quench the vapor to, in one embodiment, 6° C. Moreover, the silicon produced by reverse reaction (2) will also act to convert STB according to the reaction of:

$$Si + 3SiBr_4 + 2H_2 \rightarrow 4SiBr_3H \qquad (8)$$

Reaction (8) will also proceed quickly as discussed with regard to reaction (3) due to the enhanced catalyst exposure.

In addition, since the TBS concentration remains below equilibrium while in the packed bed (due to the dilution with $H_2$), a high ratio of TBS/STB can be recovered at the expense of having to accommodate the extra hydrogen. The result is that Table 1 is demonstrating a twenty fold increase in production per reactor volume as compared to that achieved for U.S. Pat. Application No. 2007/0173671.

Those of ordinary skill will appreciate the preceding STB converter examples are readily scaled into industrial applications. In that regard, it may be observed that the residence time in such industrial scale reactors would still be in the range of two to six seconds whereas the volumetric gas (reactant) flow per specific area for the oxide catalyst may be in the range of 10,000 to 100,000 to enjoy the advantageous production enhancements discussed above.

Although the preceding example involved the conversion of STB it will be appreciated that the concepts discussed herein will apply to the conversion of silicon tetrachloride as well. Accordingly, embodiments described above illustrate but do not limit the invention. It should also be understood that numerous modifications and variations are possible in accordance with the principles of the present invention. Accordingly, the scope of the invention is defined only by the following claims.

What is claimed is:

1. A method of closed loop silicon production, comprising:
   synthesizing tribromosilane (TBS) to produce synthesized TBS;
   thermally decomposing a feedstock tribromosilane (TBS) to produce silicon and a byproduct silicon tetrabromide (STB); and
   converting the byproduct STB into converted TBS by diluting the byproduct STB with hydrogen to provide a diluted mixture and passing the diluted mixture through a heated bed consisting essentially of silicon oxide particles at a temperature of 600 to 800° C., wherein the feedstock TBS comprises the synthesized TBS and the converted TBS, and wherein the heated bed of silicon oxide particles catalyzes.

2. The method of claim 1, wherein synthesizing TBS comprises reacting metallurgical grade silicon (MGSi) with hydrogen bromide.

3. The method of claim 1, wherein thermally decomposing TBS comprises passing the feedstock TBS through a heated fluidized bed of silicon particles.

4. The method of claim 1, further comprising: purifying the synthesized TBS through a distillation tower.

5. The method of claim 1, wherein the heated bed of silicon oxide particles is contained within a packed bed reactor.

* * * * *